US010091706B2

(12) United States Patent
Liu (10) Patent No.: US 10,091,706 B2
(45) Date of Patent: *Oct. 2, 2018

(54) NETWORK ACCESS METHOD AND MOBILE COMMUNICATIONS TERMINAL

(71) Applicant: GUANGDONG OPPO MOBILE TELECOMMUNICATIONS CORP., LTD., Dongguan (CN)

(72) Inventor: Hai Liu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/801,347

(22) Filed: Nov. 2, 2017

(65) Prior Publication Data

US 2018/0054775 A1 Feb. 22, 2018

Related U.S. Application Data

(63) Continuation of application No. 15/525,959, filed as application No. PCT/CN2016/078087 on Mar. 31, 2016.

(30) Foreign Application Priority Data

Apr. 30, 2015 (CN) .......................... 2015 1 0221597

(51) Int. Cl.
*H04W 4/00* (2018.01)
*H04W 48/08* (2009.01)
(Continued)

(52) U.S. Cl.
CPC ........... *H04W 48/08* (2013.01); *H04W 48/16* (2013.01); *H04W 48/18* (2013.01)

(58) Field of Classification Search
CPC ..... H04W 48/18; H04W 48/16; H04W 8/205; H04W 48/14; H04W 8/06; H04W 8/18;
(Continued)

(56) References Cited

U.S. PATENT DOCUMENTS

2004/0224689 A1 11/2004 Raghuram et al.
2006/0099943 A1* 5/2006 Koo ..................... H04W 48/16
455/432.1
(Continued)

FOREIGN PATENT DOCUMENTS

CN 1968502 A 5/2007
CN 102196531 A 9/2011
(Continued)

OTHER PUBLICATIONS

Huawei et al: "The MDT applicability of Equivalent PLMN identities", 3GPP Draft; R3-111912_MDT_EPLMN, 3rd Generation Partnership Project (3GPP), Mobile Competence Centre; 650, Route Des Lucioles; F-06921 Sophia-Antipolis Cedex; France, vol. RAN WG3, No. Athens, Greece; 20110822, Sep. 9, 2011 (Sep. 9, 2011), XP050541542, [retrieved on Sep. 9, 2011] *p. 1-p. 4*.

*Primary Examiner* — Timothy Pham
(74) *Attorney, Agent, or Firm* — Ladas & Parry LLP (57) ABSTRACT

A network access method includes: determining with a mobile communications terminal if a network identity of a visited public land mobile network (VPLMN) exists in an equivalent public land mobile network (EPLMN) list, obtaining a shared network information stored in an operator's server and searching for the network identity of the VPLMN from the shared network information upon a condition that the network identity of the VPLMN does not exist in the EPLMN list, adding the network identity of the VPLMN to the EPLMN list, and accessing a network based on the EPLMN list.

7 Claims, 5 Drawing Sheets

(51) Int. Cl.
*H04W 48/16* (2009.01)
*H04W 48/18* (2009.01)

(58) Field of Classification Search
CPC ..... H04W 48/10; H04W 60/00; H04W 72/10; H04W 88/06; H04W 8/183; H04W 8/20; H04W 8/26
USPC ........................................................ 455/456
See application file for complete search history.

(56) References Cited

U.S. PATENT DOCUMENTS

| | | | |
|---|---|---|---|
| 2006/0211420 A1 | 9/2006 | Ophir | |
| 2011/0098039 A1* | 4/2011 | Lim | H04M 1/72519 455/433 |
| 2011/0237250 A1* | 9/2011 | Horn | H04W 8/20 455/433 |
| 2012/0064883 A1 | 3/2012 | Kim | |
| 2012/0243467 A1* | 9/2012 | Vallurupalli | H04W 48/18 370/328 |
| 2013/0109377 A1 | 5/2013 | Al-Khudairi et al. | |
| 2014/0031033 A1* | 1/2014 | Juang | H04W 48/18 455/432.1 |
| 2014/0235241 A1 | 8/2014 | Sharan et al. | |
| 2014/0342732 A1 | 11/2014 | Manalo et al. | |
| 2015/0208293 A1* | 7/2015 | Zhang | H04W 48/18 455/433 |
| 2016/0262155 A1* | 9/2016 | Lindoff | H04W 72/0453 |

FOREIGN PATENT DOCUMENTS

| | | |
|---|---|---|
| CN | 103188638 A | 7/2013 |
| CN | 103313227 A | 9/2013 |
| CN | 104853404 A | 8/2015 |
| CN | 104902459 A | 9/2015 |
| CN | 104980997 A | 10/2015 |
| EP | 1703752 A2 | 9/2006 |
| EP | 2555547 * | 3/2012 |
| WO | 2013067014 A1 | 5/2013 |

\* cited by examiner

NETWORK ACCESS METHOD AND MOBILE COMMUNICATIONS TERMINAL

CROSS REFERENCE TO RELATED APPLICATIONS

This application is a continuation application of U.S. Ser. No. 15/525,959, filed on May 11, 2017, which is a US national phase application based upon an International Application No. PCT/CN2016/078087, filed on Mar. 31, 2016, which claims priority to Chinese Application No. 201510221597.7, filed Apr. 30, 2015. The entire disclosure of the above application is incorporated herein by reference.

BACKGROUND

1. Field of the Disclosure

The present disclosure relates to a mobile communication technology, more particularly, to a method and a mobile communication terminal for accessing a network.

2. Description of the Related Art

A public land mobile network (PLMN) is a network established and operated by the government or operators authorized by the government to provide the public with land mobile communication services. This network needs to be interconnected with a public switched telephone network (PSTN) so as to form a regional or nationwide communication network.

The identification of the PLMN is usually a series of numeric codes. For example, the network identity of the PLMN of the China Mobile is 46000; the network identity of the PLMN of the China Unicom is 46001. A user can communicate easily and fast with the mobile network provided by these operators. More and more users carry a communications terminal device to travel abroad or go on a business trip with the development in the living standard. When the user uses roaming communications (such as international roaming communications), the mobile communications terminal (such as a cellphone) needs to search for the network to obtain the network identity of the PLMN.

When the mobile communications terminal moves from a home location to a visited location (such as the mobile communications terminal roams from the home country to a visited country), the mobile communications terminal needs to access the PLMN related to the home location. However, frequently, when the mobile communications terminal moves from the home to the visited location, the mobile communications terminal usually spends a lot time (even spends dozens of minutes) to access the PLMN related to the home location successfully, which dramatically affects the user's experience.

SUMMARY

An object of the present disclosure is to propose a network access method and a mobile communications terminal. Before the mobile communications terminal is powered off or switches to a flight mode, upon detecting a Visited public land mobile network (VPLMN) is not stored in an Equivalent public land mobile network (EPLMN) list, the mobile communications terminal obtains the VPLMN from a shared network information of the operator's server and adds the VPLMN to the EPLMN list. When searching a Registered public land mobile network (RPLMN) in the visited location, the mobile communications terminal stays at a community and tries to search the network more quickly because the searched RPLMN and the VPLMN are equivalent.

In a first aspect of the present disclosure, a network access method is provided. The method includes the following:

The mobile communications terminal determines if a network identity of a visited public land mobile network (VPLMN) exists in an equivalent public land mobile network (EPLMN) list. The EPLMN list includes a network identity of a home public land mobile network (HPLMN) and the network identity of the VPLMN owned by a visited location operator who signs a roaming agreement with a home location operator who owns a subscriber identity module (SIM) card used in the mobile communications terminal.

A shared network information stored in an operator's server is obtained. The network identity of the VPLMN is searched from the shared network information upon a condition that the network identity of the VPLMN does not exist in the EPLMN list. The operator's server is the home location operator's server or the visited location operator's server, in which the visited location operator signs a roaming agreement with the home location operator.

The network identity of the VPLMN is added to the EPLMN list.

The mobile communications terminal accesses a network based on the EPLMN list.

In a second aspect of the present disclosure, a mobile communications terminal is provided. The mobile communications terminal includes a determining module, an obtaining module, an adding module, a searching unit and an accessing module.

The determining module is configured to determine if a network identity of a visited public land mobile network (VPLMN) exists in an equivalent public land mobile network (EPLMN) list. The EPLMN list comprises a network identity of a home public land mobile network (HPLMN) and the network identity of the VPLMN owned by a visited location operator who signs a roaming agreement with a home location operator who owns a subscriber identity module (SIM) card used in the mobile communications terminal.

The obtaining module is configured to obtain a shared network information stored in an operator's server and to search for the network identity of the VPLMN from the shared network information upon a condition that the network identity of the VPLMN does not exist in the EPLMN list. The operator's server is the home location operator's server or the visited location operator's server in which the visited location operator signs a roaming agreement with the home location operator.

The adding module is configured to add the network identity of the VPLMN to the EPLMN list.

The searching unit is configured to search the network in a visited location.

The accessing module is configured to access a network based on the EPLMN list.

According to the technical scheme proposed by the embodiment, not only the network identity of the PLMN owned by the mobile communications terminal is added to the EPLMN list, but also the obtained network identity of the PLMN of a visited location operator who signs a roaming agreement with the home location operator who owns the PLMN of the mobile communications terminal is added to the EPLMN list. All of network identities of the PLMNs stored in the EPLMN list are regarded to be equivalent by the mobile communications terminal. Therefore, the network access of the mobile communications terminal is realized based on the EPLMN list. Because the network identities of the PLMNs of the visited location operators who sign a roaming agreement with the home location operator who owns the PLMN of the mobile communications terminal are stored in the EPLMN list, it is of high possibility for the mobile communications terminal to get one of the network identities of the PLMNs stored in the EPLMN list exactly. Therefore, it is of high possibility for the mobile communications terminal to access the network on some location, which is very beneficial for shortening user's waiting time in communication and further extremely enhancing user's communication experience. (Ideally, it takes only a couple of seconds for the mobile communication terminal to complete network access.)

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

The terminology used herein is for the purpose of describing particular embodiments only and is not intended to be limiting of the invention. As used herein, the singular forms "a", "said" and "the" are intended to include the plural forms as well, unless the context clearly indicates otherwise. It will be understood that the term "and/or," when used in this specification, specify one or more associated elements, alone or in combination, are provided.

A public land mobile network (PLMN) is a wireless communication system, which is a network established and operated by the government or operators authorized by the government to provide the public with land mobile communication services. The network and the public exchange telephone network (PSTN) are usually connected with each other to form the communications network for a whole area or a country-scale region. PLMN is identified by a combination of mobile country code (MCC) and mobile network code (MNC) (PLMN=MCC+MNC). For example, PLMNs for China Mobile Communications Corporation include 46000, 46002, 46007, and 46008; PLMNs for China Unicom Corporation includes 46001, 46006, and 46009. PLMN is a wireless communications system for a user moving with transportation on the land or a user in walking. However, portable Internet devices for users are more and more popular. An ideal PLMN system provides considerable services to the user with a portable Internet device and the fixed network. It is an extraordinary challenge when the PLMN system is installed in a more complicated area since a base is hard to be found out and maintained. For example, there are many obstacles in a city, such as buildings and a variety of radio frequencies and radiations, which cause noise and interference.

Registered PLMN (RPLMN): The RPLMN is a PLMN before the mobile communications terminal is powered off last time or offline. The 3GPP 2003 TSG TP-21 conference concludes that the parameter is deleted from the USIM card but is saved in a memory of the terminal.

Equivalent PLMN (EPLMN): The EPLMN and the PLMN selected currently by the mobile communications terminal stay on equal status and have the same priority.

Equivalent Home PLMN (EHPLMN): The EHPLMN is a local PLMN and stays on equal status with the PLMN selected currently by the mobile communications terminal. In fact, the EHPLMN and the EPLMN are just like the new-built 158 network provided by China Mobile Communications Corporation, and the PLMN is just like the original 135-139 networks.

Home PLMN (HPLMN): The HPLMN is a PLMN to which a subscriber of the mobile communication terminal belongs. That is, the MCC and the MNC of an international mobile subscriber identity (IMSI) stored in the universal subscriber identity module (USIM) card of the mobile communications terminal is identical to the MCC and the MNC in the HPLMN. A user owns only one PLMN.

Visited PLMN (VPLMN): The VPLMN is that PLMN on which the subscriber of the mobile communications terminal has roamed when leaving his (her) HPLMN. The VPLMN is not identical to the MCC and the MNC of the IMSI in a subscriber identity module (SIM) card. When the mobile communications terminal is not within coverage area of their HPLMN, one VPLMN will be selected.

The mobile communications terminal includes, but is not limited to, any terminals for communications such as cellphones, watches, and tablets.

Figure 1:
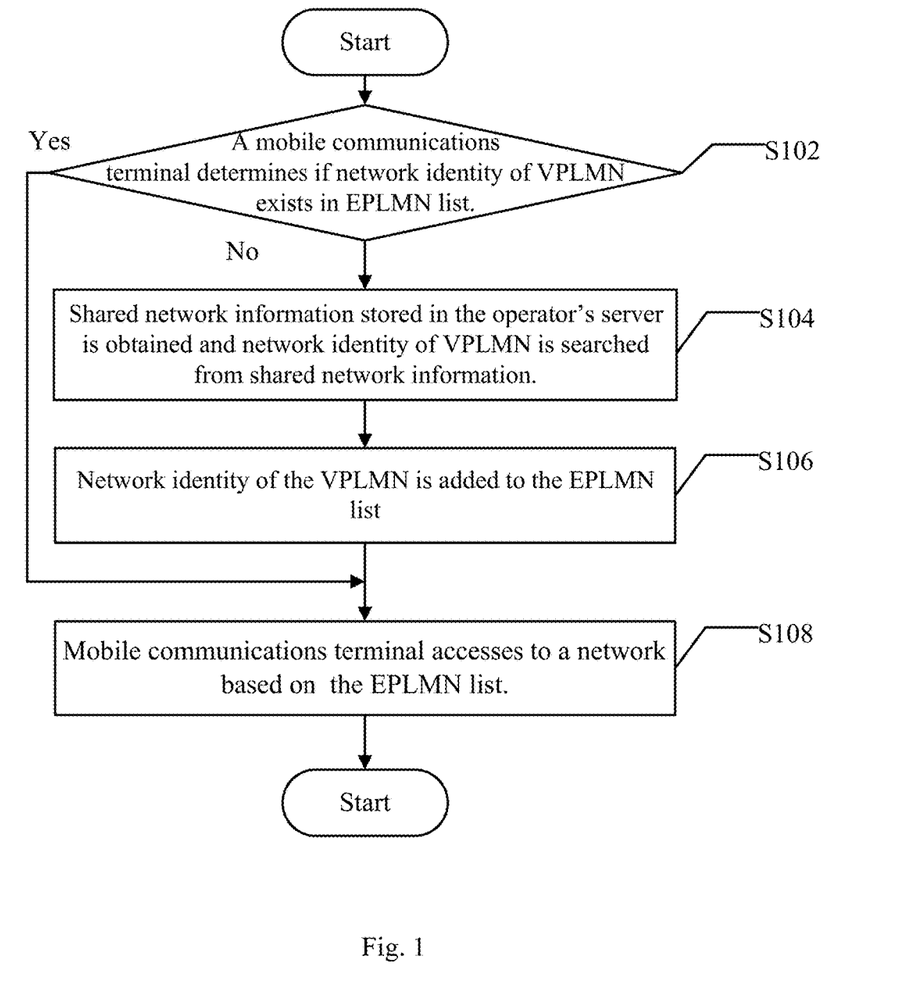
FIG. 1 illustrates a flowchart of a network access method according to an embodiment of the present disclosure.

Please refer to FIG. 1 which illustrates a flowchart of a network access method according to an embodiment of the present disclosure. The method can begin at block S102.

At block S102, the mobile communications terminal determines if the network identity of the VPLMN exists in the EPLMN list. The EPLMN list includes the network identity of the HPLMN and network identities of VPLMNs. The network identities of the VPLMNs are network identities of PLMNs of visited location operators who sign a roaming agreement with the home location operator which owns the SIM card used in the mobile communications terminal.

Specifically, the mobile communications terminal may be a cellphone. When the user travels abroad, goes on a business trip, etc. with his/her cellphone, the mobile communications terminal will be at the international roaming state. If the visited location and the home location are at different countries, for example, the home location is at China, and the visited location is at the United States (U.S.), Korea, etc. If the user departs from China and arrives at the U.S. with his/her cellphone, the home location and the visited location are at China and the U.S., respectively. At this time, the mobile communications terminal is at the international roaming state.

Before arriving at the visited location, the mobile communications terminal may determine if the network identity of the VPLMN exists in the EPLMN list. The network identity of the VPLMN is the network identity of the PLMN of the visited location operator who signs a roaming agreement with the home location operator which issues the SIM card used in the mobile communications terminal. For example, if the user goes on a business trip to the U.S. with his/her cellphone, the cellphone may determine if the U.S. network identity exists in the stored EPLMN list before arriving at the US.

In this embodiment, the network identity may include network codes. For example, the operator China Mobile has four network codes, namely, 46000, 46002, 46007 and 46008, and the operator China Unicom has three network codes 46001, 46006 and 46009. The EPLMN list may include a pre-added network identity of the HPLMN and a pre-added network identity of a VPLMN. Or, the EPLMN list may include a pre-added network identity of an EHPLMN and a pre-added network identity of a VPLMN. Or, the EPLMN list may include a pre-added network identity of the HPLMN, a pre-added network identity of an EHPLMN, and a pre-added network identity of a VPLMN. The pre-added network identity of the VPLMN is equivalent to the RPLMN which is registered on the mobile communications terminal before the terminal is powered off or offline last time. The priority of the VPLMN is the same to that of the RPLMN.

At block S108 of accessing the network based on the EPLMN list is performed if the network identity of the VPLMN exists in the EPLMN list, otherwise, searching for the network identity of the VPLMN from a shared network information stored in the operator's server at block S104 is performed.

At block S104, the shared network information stored in the operator's server is obtained and the network identity of the VPLMN is searched from the shared network information if the network identity of the VPLMN does not exist in the EPLMN list. The operator's server belongs to the home location operator or/and the visited location operator who signs a roaming agreement with the home location operator.

Specifically, if the network identity of the VPLMN does not exist in the EPLMN list, the shared network information stored in the operator's server is obtained and the network identity of the VPLMN is searched from the shared network information. The mobile communications terminal sends a request of obtaining the shared network information stored in the operator's server to the operator's server. The mobile communications terminal may receive the shared network information from the operator's server. The shared network information includes, but is not limited to, the network identity of the HPLMN, the network identity of the EPLMN, and the network identity of the VPLMN. In other words, the shared network information may include HPLMN, EPLMN, and VPLMN. The shared network information may includes the network identity of the VPLMN of the operator's server delivered by other terminals so that the mobile communications terminal can obtain the network identity of the VPLMN by searching for the shared network information stored in the operator's server.

For example, the cellphone can obtain the shared network information stored in the operator's server and search for the network identity of the VPLMN from the shared network information.

At block S106, the network identity of the VPLMN is added to the EPLMN list.

Figure 2:
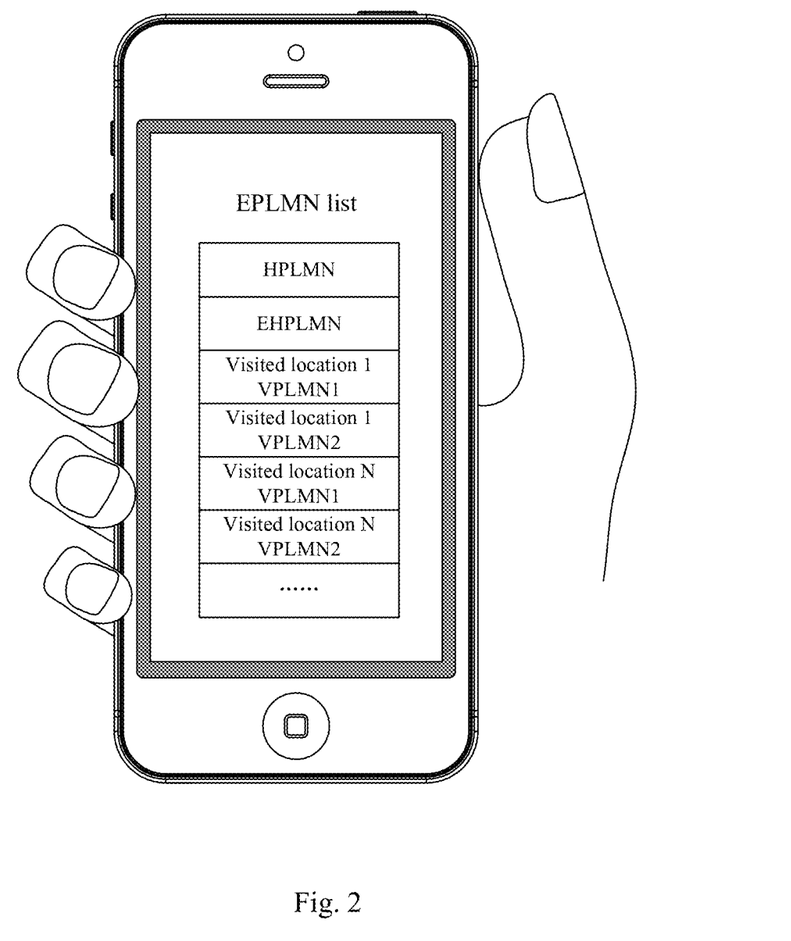
FIG. 2 illustrates an EPLMN list according to an embodiment of the present disclosure.

Specifically, the received network identity of the VPLMN is added to the EPLMN list. The EPLMN list is shown in FIG. 2. The EPLMN have an equivalent status and the same priority to a public land mobile network (PLMN) which is currently chosen by the user. The EPLMN mainly solves staying and roaming strategies of a user of the shared network and the original network. The operator can deploy the EPLMN to realize network sources sharing. From the business perspective, a variety of operators' network sources or different PLMNs owned by the same operator are shared in communications. The EPLMN list may include a pre-added network identity of the HPLMN and a pre-added network identity of a VPLMN. Or, the EPLMN list may include a pre-added network identity of an EHPLMN and a pre-added network identity of a VPLMN. Or, the EPLMN list may include a pre-added network identity of the HPLMN, a pre-added network identity of an EHPLMN, and a pre-added network identity of a VPLMN. The pre-added network identity of the VPLMN is equivalent to the RPLMN which is registered on the mobile communications terminal before the terminal is powered off or offline last time. The priority of the VPLMN is the same to that of the RPLMN.

At block S108, the mobile communications terminal accesses to a network based on the EPLMN list.

Specifically, after moving from the home location to the visited location, the mobile communications terminal can receive the user's command of powering on the terminal or turning off the current flight mode. After the mobile communications terminal enables or the current flight mode is turned off, the terminal starts to search the network based on the network identities stored in the EPLMN list. The mobile communications terminal can obtain the network identity of the VPLMN broadcasted by the base station. The above-mentioned network identity obtained by scanning matches the network identity of the PLMN in the above-mentioned EPLMN list with the mobile communications terminal.

If a network identity of a VPLMN broadcasted by the community base station in the visited location matches one of the network identities in the EPLMN list, the connection between the mobile communications terminal and the VPLMN is established.

Figure 3:
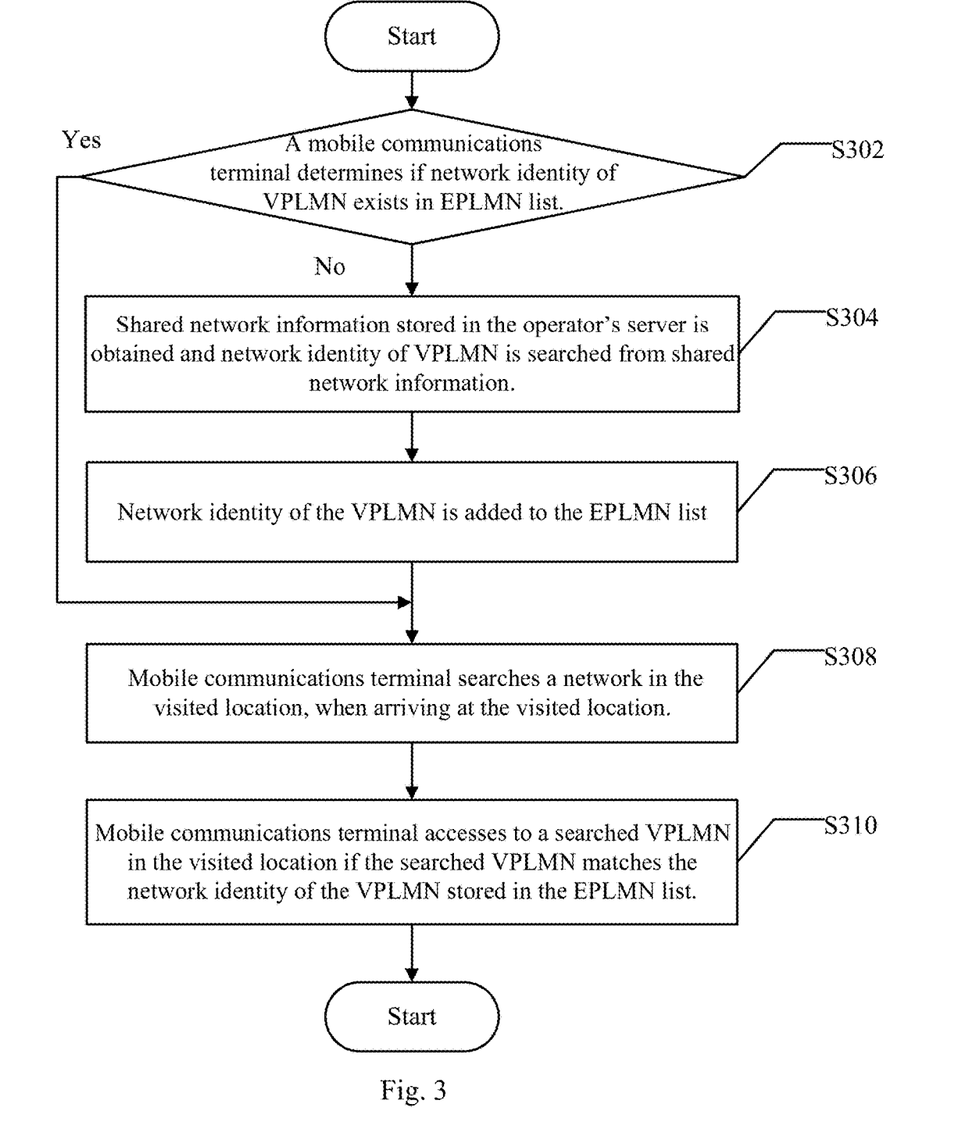
FIG. 3 illustrates a flowchart of a network access method according to anther embodiment of the present disclosure.

Please refer to FIG. 3 illustrating a flowchart of a network access method according to anther embodiment of the present disclosure. The method can begin at block S302.

At block S302, the mobile communications terminal determines if the network identity of the VPLMN exists in the EPLMN list. The EPLMN list includes the network identity of the HPLMN and network identities of VPLMNs. The network identities of the VPLMNs are network identities of PLMNs of visited location operators who sign a roaming agreement with the home location operator which owns the SIM card used in the mobile communications terminal.

Specifically, the mobile communications terminal may be a cellphone. When the user travels abroad, goes on a business trip, etc. with his/her cellphone, the mobile communications terminal will be at the international roaming state. If the visited location and the home location are at different countries, for example, the home location is at China, and the visited location is at the United States (U.S.), Korea, etc. If the user departs from China and arrives at the U.S. with his/her cellphone, the home location and the visited location are at China and the U.S., respectively. At this time, the mobile communications terminal is at the international roaming state.

Before arriving at the visited location, the mobile communications terminal may determine if the network identity of the VPLMN exists in the EPLMN list. The network identity of the VPLMN is the network identity of the PLMN of the visited location operator who signs a roaming agreement with the home location operator which issues the SIM card used in the mobile communications terminal. For example, if the user goes on a business trip to the U.S. with his/her cellphone, the cellphone may determine if the U.S. network identity exists in the stored EPLMN list before arriving at the US.

In this embodiment, the network identity may include network codes. For example, the operator China Mobile has four network codes, namely, 46000, 46002, 46007 and 46008, and the operator China Unicorn has three network codes 46001, 46006 and 46009. The EPLMN list may include a pre-added network identity of the HPLMN and a pro-added network identity of a VPLMN. Or, the EPLMN list may include a pre-added network identity of an EHPLMN and a pre-added network identity of a VPLMN. Or, the EPLMN list may include a pre-added network identity of the HPLMN, a pre-added network identity of an EHPLMN, and a pre-added network identity of a VPLMN. The pre-added network identity of the VPLMN is equivalent to the RPLMN which is registered on the mobile communications terminal before the terminal is powered off or offline last time. The priority of the VPLMN is the same to that of the RPLMN.

Accessing the network based on the EPLMN list at block S308 is performed if the network identity of the VPLMN exists in the EPLMN list, otherwise, searching for the network identity of the VPLMN from a shared network information stored in the operator's server at block S304 is performed.

At block S304, the shared network information stored in the operator's server is obtained and the network identity of the VPLMN is searched from the shared network information if the network identity of the VPLMN does not exist in the EPLMN list. The operator's server belongs to the home location operator or/and the visited location operator who signs a roaming agreement with the home location operator.

Specifically, if the network identity of the VPLMN does not exist in the EPLMN list, the shared network information stored in the operator's server is obtained and the network identity of the VPLMN is searched from the shared network information. The mobile communications terminal sends a request of obtaining the shared network information stored in the operator's server to the operator's server. The mobile communications terminal may receive the shared network information from the operator's server. The shared network information includes, but is not limited to, the network identity of the HPLMN, the network identity of the EPLMN, and the network identity of the VPLMN. In other words, the shared network information may include HPLMN, EPLMN, and VPLMN. The shared network information may includes the network identity of the VPLMN of the operator's server delivered by other terminals so that the mobile communications terminal can obtain the network identity of the VPLMN by searching for the shared network information stored in the operator's server.

For example, the cellphone can obtain the shared network information stored in the operator's server and search for the network identity of the VPLMN from the shared network information.

At block S306, the network identity of the VPLMN is added to the EPLMN list.

Specifically, the received network identity of the VPLMN is added to the EPLMN list. The EPLMN list is shown in FIG. 2. The EPLMN have an equivalent status and the same priority to a public land mobile network (PLMN) which is currently chosen by the user. The EPLMN mainly solves staying and roaming strategies of a user of the shared network and the original network. The operator can deploy the EPLMN to realize network sources sharing. From the business perspective, a variety of operators' network sources or different PLMNs owned by the same operator are shared in communications. The EPLMN list may include a pre-added network identity of the HPLMN and a pre-added network identity of a VPLMN. Or, the EPLMN list may include a pre-added network identity of an EHPLMN and a pre-added network identity of a VPLMN. Or, the EPLMN list may include a pre-added network identity of the HPLMN, a pre-added network identity of an EHPLMN, and a pre-added network identity of a VPLMN. The pre-added network identity of the VPLMN is equivalent to the RPLMN which is registered on the mobile communications terminal before the terminal is powered off or offline last time. The priority of the VPLMN is the same to that of the RPLMN.

At block S308, the mobile communications terminal searches a network in the visited location, when arriving at the visited location.

Specifically, the mobile communications terminal may be a cellphone. When the user travels abroad, goes on a business trip, and so on with his/her cellphone, the mobile communications terminal will be at the international roaming state. After the user with his/her cellphone arrives at the visited location, the mobile communications terminal can search the network in the visited location.

For example, a user who departs from the home location, e.g. China and arrives at the visited location, e.g. U.S. with his/her cellphone can search the network using the cellphone the first time in the US.

At block S310, the mobile communications terminal accesses to a searched VPLMN in the visited location if the searched VPLMN matches the network identity of the VPLMN stored in the EPLMN list.

Specifically, after arriving at the visited location, the mobile communications terminal can receive the user's command of powering on the terminal or turning off the current flight mode. After the mobile communications terminal enables or the current flight mode is turned off, the terminal starts to search the network based on the network identities stored in the network list. The mobile communications terminal can obtain the network identity of the VPLMN broadcasted by the base station. The above-mentioned network identity obtained by scanning matches the network identity of the PLMN in the above-mentioned EPLMN list with the mobile communications terminal. If a VPLMN in the visited location is found out to match the network identity in the EPLMN list, the connection between the mobile communications terminal and the matched VPLMN is established.

Further, the cellphone may read the stored network list and obtain the network identity of the VPLMN in the network list. The mobile communications terminal may issue a request of network registration and access to the visited network when the mobile communications terminal searches and ensures that the network identity of the VPLMN broadcasted by a community base station matches one of the network identities in the EPLMN list.

Figure 4:
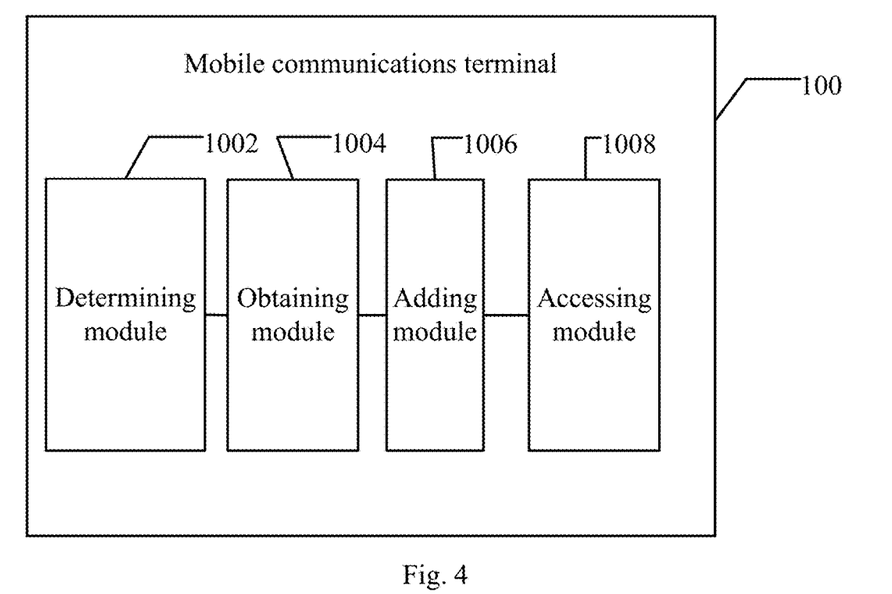
FIG. 4 illustrates a block diagram of a mobile communications terminal according to an embodiment of the present disclosure.

Please refer to FIG. 4 illustrating a block diagram of a mobile communications terminal 100 according to an embodiment of the present disclosure. As shown in FIG. 4, the mobile communications terminal 100 includes a determining module 1002, an obtaining module 1004, an adding module 1006, and an accessing module 1008.

The determining module 1002 is configured to determine if a network identity of a visited public land mobile network (VPLMN) exists in an equivalent public land mobile network (EPLMN) list. The EPLMN list comprises a network identity of a home public land mobile network (HPLMN) and the network identity of the VPLMN owned by a visited location operator who signs a roaming agreement with a home location operator who owns a subscriber identity module (SIM) card used in the mobile communications terminal.

The obtaining module 1004 is configured to obtain a shared network information stored in an operator's server and to search for the network identity of the VPLMN from the shared network information upon a condition that the network identity of the VPLMN does not exist in the EPLMN list. The operator's server is the home location operator's server or the visited location operator's server in which the visited location operator signs a roaming agreement with the home location operator.

The adding module 1006 is configured to add the network identity of the VPLMN to the EPLMN list.

The accessing module 1008 is configured to access a network based on the EPLMN list.

Figure 5:
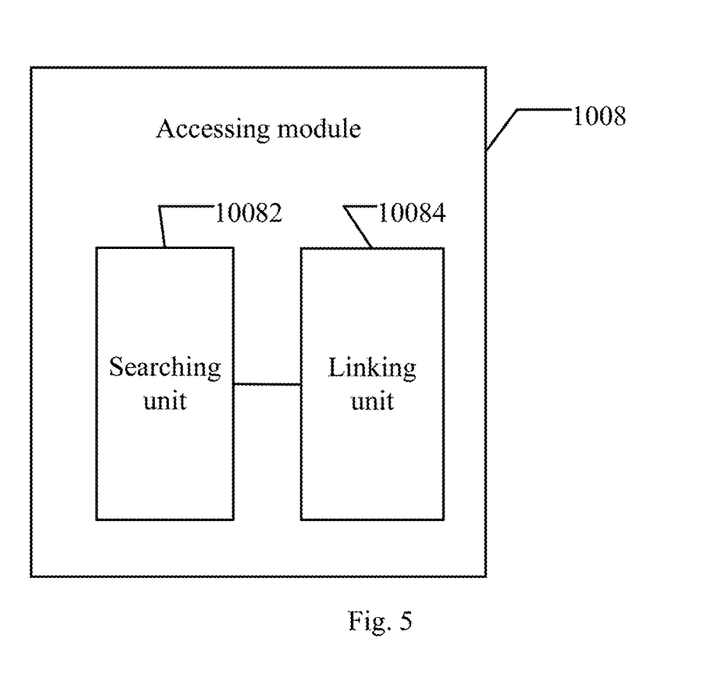
FIG. 5 illustrating a block diagram of an accessing module according to an embodiment of the present disclosure.

Please refer to FIG. 5 illustrating a block diagram of an accessing module according to an embodiment of the present disclosure. As shown in FIG. 5, the accessing module 1008 includes a searching unit 10082 and a linking unit 10084.

The searching unit 10082 is configured to search the network in a visited location.

The linking unit 10084 is configured to establish a communication connection between the mobile communications terminal and the VPLMN upon a condition that the searching unit 10082 finds out the network identity of the VPLMN existing in the EPLMN list.

Figure 6:
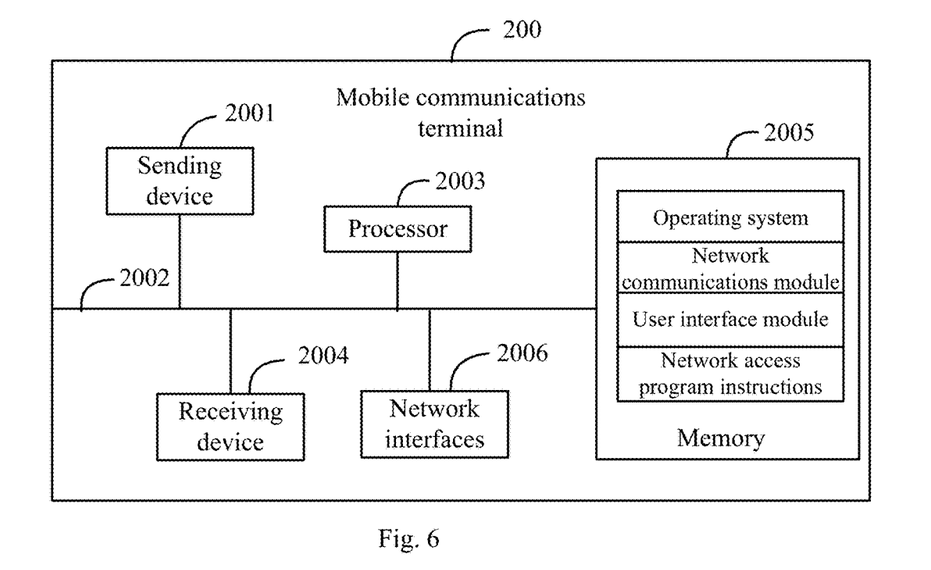
FIG. 6 illustrates a block diagram of a mobile communications terminal according to another embodiment of the present disclosure.

Furthermore, please refer to FIG. 6 illustrating a block diagram of another mobile communications terminal 200 according to another embodiment of the present disclosure. The mobile communications terminal 200 includes a sending device 2001, one or more communications bus 2002, one or more processor 2003, such as central processing unit (CPU), a receiving device 2004, a memory 2005, and one or more network interfaces 2006. The communications bus 2002 is used to realize the connections among the components. Optionally, the network interfaces 2006 include a standard radio interface such as Wi-Fi interface, Bluetooth interface, and infrared interface. The memory 2005 may be a high-speed random-access memory (RAM) or a non-volatile memory such as one or more magnetic disc memory. Optionally, the memory 2005 is one or more memory system away from the more processor 2003. The memory 2005, as a computer-readable storage medium, may include an operating system, a network communications module, a user interface module, and network access program instructions.

In the mobile communications terminal 200 illustrated in FIG. 6, the network interfaces 2006 are configured to link the operator's server for communicating with the operator's server. The processor 2003 executes the network access program instructions to perform the following operations.

The processor executes the computer executable program instructions to determine if a network identity of a visited public land mobile network (VPLMN) exists in an equivalent public land mobile network (EPLMN) list. The EPLMN list includes a network identity of a home public land mobile network (HPLMN) and the network identity of the VPLMN owned by a visited location operator who signs a roaming agreement with a home location operator who owns a subscriber identity module (SIM) card used in the mobile communications terminal.

The processor executes the computer executable program instructions to obtain a shared network information stored in an operator's server, and to search for the network identity of the VPLMN from the shared network information upon a condition that the network identity of the VPLMN does not exist in the EPLMN list. The operator's server is the home location operator's server or the visited location operator's server in which the visited location operator signs a roaming agreement with the home location operator.

The processor executes the computer executable program instructions to add the network identity of the VPLMN to the EPLMN list.

The processor executes the computer executable program instructions to access a network based on the EPLMN list.

Furthermore, when the processor executes the computer executable program instructions to access a network based on the EPLMN list, the processor executes the computer executable program instructions to perform the following operations.

The processor executes the computer executable program instructions to search the network in a visited location where the mobile communications terminal is.

The processor executes the computer executable program instructions to establish a communication connection between the mobile communications terminal and the VPLMN upon a condition that the network identity of the VPLMN exists in the EPLMN list.

Furthermore, the network identity of the VPLMN and a network identity of a registered public land mobile network (RPLMN) which is firstly searched by the mobile communications terminal are equivalent.

Furthermore, the network identity of the VPLMN and a network identity of a registered public land mobile network (RPLMN) which is firstly searched by the mobile communications terminal are equivalent.

Furthermore, the visited location and the home location belong to different countries or different administrative regions.

It is noted that the operations of the mobile communications terminal illustrated in FIGS. 4-6 can refer to the method as illustrated in FIGS. 1-3, it will not be described here.

Consequently, according to the technical scheme proposed by the embodiment, not only the network identity of the PLMN owned by the mobile communications terminal is added to the EPLMN list, but also the obtained network identity of the PLMN of a visited location operator who signs a roaming agreement with the home location operator who owns the PLMN of the mobile communications terminal is added to the EPLMN list. All of network identities of the PLMNs stored in the EPLMN list are regarded to be equivalent by the mobile communications terminal. Therefore, the network access of the mobile communications terminal is realized based on the EPLMN list. Because the network identities of the PLMNs of visited location operators who sign a roaming agreement with the home location operator who owns the PLMN of the mobile communications terminal are stored in the EPLMN list, it is of high possibility for the mobile communications terminal to get one of the network identities of the PLMNs stored in the EPLMN list exactly. Therefore, it is of high possibility for the mobile communications terminal to access the network on some location, which is very beneficial for shortening user's waiting time in communication and further extremely enhancing user's communication experience. (Ideally, it takes only a couple of seconds for the mobile communication terminal to complete network access.)

All or part of the procedure introduced in the aforementioned embodiment may be completed in related hardware commanded by a computer program, which may be easily understood by one of ordinary skill in the art. The program may be stored in a computer-readable storage medium. The executed program may include the procedures used in each of the methods introduced in the embodiments. The storage medium may be a disc, an optical disc, a read-only memory (ROM), a random access memory (RAM) and so on.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A mobile communications terminal, comprising:
   a processor; and
   a memory connected with the processor, the memory comprising a plurality of program instructions executable by the processor, the plurality of program instructions comprising:
      a determining module configured to cause the processor to determine if a network identity of a visited public land mobile network (VPLMN) exists in an equivalent public land mobile network (EPLMN) list, wherein the EPLMN list comprises a network identity of a home public land mobile network (HPLMN) and a network identity of a VPLMN owned by a visited location operator who signs a roaming agreement with a home location operator who owns a subscriber identity module (SIM) card used in the mobile communications terminal;
      an obtaining module configured to cause the processor to obtain a shared network information stored in an operator's server and to search for the network identity of the VPLMN from the shared network information upon a condition that the network identity of the VPLMN does not exist in the EPLMN list, wherein the operator's server is the home location operator's server or the visited location operator's server in which the visited location operator signs a roaming agreement with the home location operator;
      an adding module configured to cause the processor to add the network identity of the VPLMN to the EPLMN list; and
      an accessing module configured to cause the processor to access a network based on the EPLMN list.

2. The mobile communications terminal of claim 1, wherein the plurality of program instructions further comprises:
   a searching unit configured to cause the processor to search the network in a visited where the mobile communications terminal is; and
   a linking unit configured to cause the processor to establish a communication connection between the mobile communications terminal and the VPLMN upon a condition that the searching unit finds out the network identity of the VPLMN existing in the EPLMN list.

3. The mobile communications terminal of claim 2, wherein the network identity of the VPLMN and a network identity of a registered public land mobile network (RPLMN) which is firstly searched by the mobile communications terminal are equivalent.

4. The mobile communications terminal of claim 2, wherein the visited location and the home location belong to different countries or different administrative regions.

5. The mobile communications terminal of claim 1, wherein the network identity of the VPLMN and a network identity of a registered public land mobile network (RPLMN) which is firstly searched by the mobile communications terminal are equivalent.

6. The mobile communications terminal of claim 5, wherein the visited location and the home location belong to different countries or different administrative regions.

7. The mobile communications terminal of claim 1, wherein the visited location and the home location belong to different countries or different administrative regions.

* * * * *